United States Patent Office 3,057,830
Patented Oct. 9, 1962

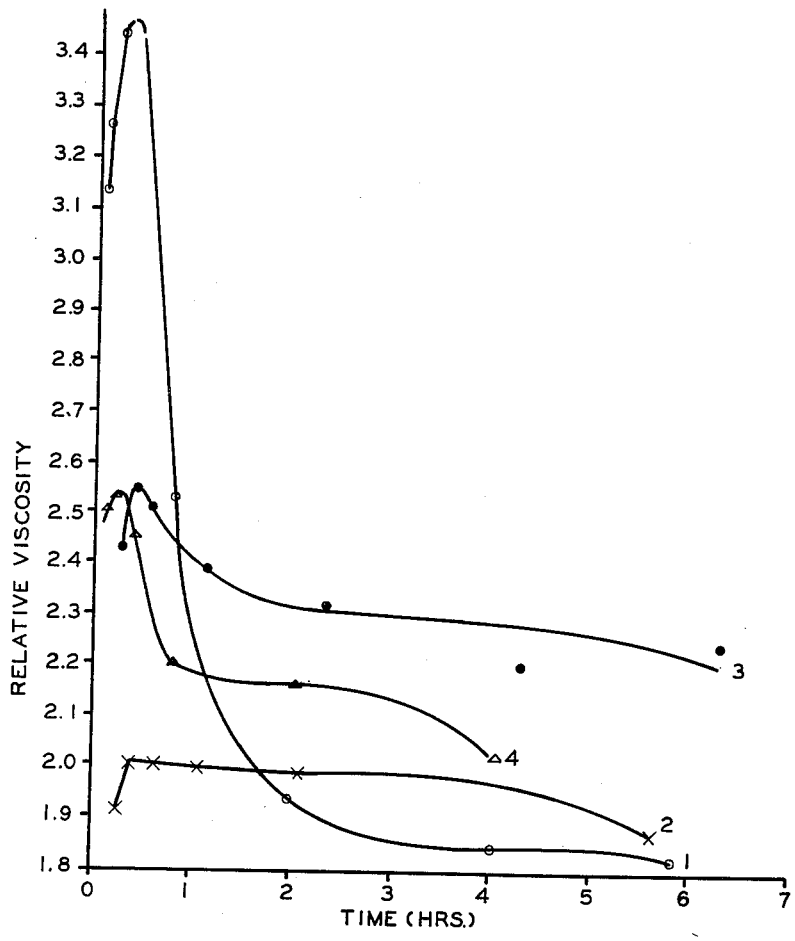

3,057,830
POLYMERIZATION OF CYCLIC AMIDES
Thomas F. Corbin, Jr., Asheville, N.C., assignor to American Enka Corporation, Enka, N.C., a corporation of Delaware
Filed Feb. 9, 1959, Ser. No. 792,138
10 Claims. (Cl. 260—78)

This invention relates to the polymerization of cyclic amides, and particularly to a process for rapidly polymerizing cyclic amides.

Numerous ways are known for preparing polyamides. Since it is obviously desirable to shorten the period required for carrying out the polymerization reaction, consideration work has been done in the field of catalytic polymerization involving the use of catalysts, initiators, or promotors for accelerating the reaction. Alkali metals and certain compounds containing them have been suggested as catalytic materials useful in lowering the time of reaction. However, in practice, such catalysts tend to produce an initial condition of extremely high viscosity which impedes the flow of the polymerizing mass through a continuous process vessel. The advantages of such catalysts cannot be fully realized if batch-wise operation becomes necessary due to such high initial viscosity.

More recently it has been proposed to reduce the above-mentioned viscosity peak by the use of a mixed catalyst consisting of an alkali-metal hydroxide and an alkali metal or alkali-metal amide or hydride. This proposal has not been found to operate in a completely satisfactory manner. For example, the mixed catalyst residue is removed on subsequent washing of the polymer. This is objectionable because this residue constitutes a viscosity stabilizer which preferably is allowed to remain in the polymer, even after washing. Furthermore, this proposal entails the use of alkali metal hydroxides and this is objectionable from the handling viewpoint.

It is an object of the present invention to provide an improved process for polymerizing cyclic amides.

Another object is to reduce the initial viscosity peak which occurs when a cyclic amide is polymerized in the presence of an alkaline catalyst.

A further object is to provide a new viscosity stabilizer or "chain stopper" for use in a process for rapidly polymerizing cyclic amides.

Still another object is to provide a new process for polymerizing cyclic amides which utilizes a viscosity stabilizer or "chain stopper" which is not removed when the resulting polyamide is washed.

The objects of the invention are attained by supplying to a reaction vessel a cyclic amide monomer, a rapid polymerization catalyst and a small amount of a carboxy amide chain stopper in which the amide group is not an integral part of a ring structure, subjecting the mixture to polymerizing conditions and continuously withdrawing a polyamide from the reaction vessel.

The invention is particularly adapted to a continuous process as opposed to a batch operation. In practicing the invention, significant amounts of water are to be avoided in the polymerizing mass since the presence of water is detrimental to this type of rapid polymerization.

The invention is illustrated by the following examples. In Examples I and II caprolactam is used as the cyclic amide to be polymerized, lithium hydride is the catalyst and benzamide is the amide chain stopper used to reduce the initial viscosity peak which otherwise occurs.

EXAMPLE I

Epsilon-caprolactam in the amount of 285 grams (2.52 moles) was dried by refluxing in a heated vessel 1 mm. pressure for 30 minutes while removing water. The vacuum was broken by admitting nitrogen and 0.927 gram (0.00766 mole) of benzamide and 0.256 gram (0.0321 mole) of lithium hydride [1] were added. The mixture was again refluxed under vacuum at 1–5 mm. for about 30 minutes—or until substantially all of the hydrogen formed by the reaction between caprolactam and lithium hydride was expelled. The vacuum was then broken by admitting nitrogen to the vessel.

Six 15 gram portions of the lactam-catalyst mixture were transferred with a minimum of exposure to air to glass polymerization tubes. Each of the loaded tubes was thoroughly flushed with nitrogen in order to remove any air present. The tubes were then heated to a temperature of 230° C. while maintaining a pressure of one atmosphere by means of nitrogen-filled balloons connected to the tubes. At varying time intervals, a tube was withdrawn and the contents allowed to cool. The polymer was analyzed for percent methanol-extractable content; the relative viscosity was determined on the extracted samples. The results are given in Table I.

Table I

| Sample No. | Hours at 230° C. | Percent Methanol Extractables | Relative Viscosity |
|---|---|---|---|
| 1 | .20 | 19.6 | 2.62 |
| 2 | .30 | 12.6 | 2.67 |
| 3 | .50 | 9.8 | 2.62 |
| 4 | 1.00 | 9.9 | 2.41 |
| 5 | 2.00 | 10.6 | 2.04 |
| 6 | 4.00 | 10.6 | 1.98 |
| 7 | 6.00 | 10.2 | 1.94 |

EXAMPLE II

Two hundred and eighty-six grams of epsilon-caprolactam was prepared by drying as in Example I. After breaking the vacuum with nitrogen, 0.226 gram (0.0321 mole) of lithium hydride was added. The mixture was then further processed as in Example I. Tubes were withdrawn at varying time intervals and the contents analyzed as previously described. The results, presented in Table II, clearly show the effect of the benzamide in reducing the initial viscosity peak in Example I.

Table II

| Sample No. | Hours at 230° C. | Percent Methanol Extractables | Relative Viscosity |
|---|---|---|---|
| 1 | .167 | 9.6 | 8.6 |
| 2 | .40 | 9.3 | 5.8 |
| 3 | .80 | 9.6 | 3.78 |
| 4 | 1.50 | 10.1 | 2.69 |
| 5 | 3.00 | 10.2 | 2.36 |
| 6 | 5.00 | 10.2 | 2.20 |

EXAMPLE III

Two hundred and ninety-three grams of epsilon-caprolactam was dried as in Example I. After breaking the vacuum with nitrogen, 0.50 gram (0.0217 mole) of sodium metal and 1.10 grams (.00908 mole) of benzamide were added. The mixture was heated at about 100° C. and 1–5 mm. pressure until the reaction between the sodium metal and the lactam was complete. The mixture was then further processed as in Example I. The results are presented in Table III.

[1] The LiH used in these experiments was obtained from the Anderson Chemical Co., Weston, Michigan. The percent LiH is calculated using the assumption that the LiH is 100% pure. Analysis, however, indicated that the LiH was about 77% LiH and 23% LiOH by weight.

Table III

| Sample No. | Hours at 230° C. | Percent Methanol Extractables | Relative Viscosity |
|---|---|---|---|
| 1 | .35 | 49.1 | 1.95 |
| 2 | .45 | 17.6 | 2.46 |
| 3 | .60 | 10.4 | 2.43 |
| 4 | .90 | 9.6 | 2.39 |
| 5 | 1.30 | 10.2 | 2.23 |
| 6 | 2.80 | 10.5 | 2.06 |
| 7 | 4.80 | 10.6 | 1.98 |

These results indicate that there is no essential difference in the results of polymerization when sodium metal is used as the catalyst in place of lithium hydride.

EXAMPLE IV

Three hundred and ninety-four grams of epsilon-caprolactam was dried as in Example I. After breaking the vacuum with nitrogen, 0.331 gram (0.0418 mole) of lithium hydride and 1.40 grams (0.0105 mole) of acetanilide were added. The mixture was further processed as described in Example I. The results are given in Table IV.

Table IV

| Sample No. | Hours at 230° C. | Percent Methanol Extractables | Relative Viscosity |
|---|---|---|---|
| 1 | .10 | 9.56 | 3.27 |
| 2 | .20 | 9.07 | 3.16 |
| 3 | .40 | 9.15 | 3.04 |
| 4 | .90 | 9.46 | 2.67 |
| 5 | 1.90 | 9.93 | 2.17 |
| 6 | 3.90 | 9.90 | 2.17 |
| 7 | 6.40 | 9.93 | 2.14 |

These results indicate that acetanilide affects the viscosity versus time of polymerization relationship in a manner similar to that of benzamide in that the initial viscosity peak is greatly lowered when these amides are present.

The term "relative viscosity" as used herein is intended to mean the ratio of flow time in a capillary at 25° C. of a 1% solution of the polymer in 90% formic acid relative to the rate for formic acid itself. The term "percent methanol extractables" means the amount of material removed when the polymer is extracted with methanol, such as by refluxing.

While the above examples disclosed the use of benzamide and acetanilide as the chain stopper, other suitable amides may be used. For example, acetamide and diacetyl hexamethylene diamine have been effectively used.

Other representative amides which may be used when practicing this invention are:

Dimethyl formamide
Formamide
N-methyl benzamide
4-methyl benzamide
4-chloro benzamide
Diacetyl tetramethylene diamine
Adipamide
Terphthalamide In general, any carbonamide in which the amide group is not an integral part of a ring structure may be used in practicing the invention.

The effect of the amides of this invention on the initial viscosity peak is shown in the graph attached. In the experiment represented by each of the four curves, lithium hydride was used as a rapid polymerization catalyst for epsilon-caprolactam. In curve 1, which has a pronounced viscosity peak, caprolactam was polymerized in the presence of 1.3% LiH, and 1.2% NaOH at 230° C. This indicates that the elimination of the high initial viscosity peak cannot easily be attained by use of this mixed catalyst system. Curves 2, 3 and 4 show that the initial viscosity peak can be greatly lowered when certain amides are used as chain stoppers or viscosity stabilizers. Moreover, these curves show that the polymerization may be easily controlled since the viscosity is not greatly affected when the catalyst or amide concentrations are varied or when different temperatures are employed. Curve 2, which has virtually no initial viscosity peak, represents the use of 0.87% LiH as a catalyst and 0.40% acetamide as a chain stopper. Curves 3 and 4 represent reactions which may easily be carried out in a continuous manner. In the reactions represented by these curves, 0.80% LiH, 0.30% benzamide, and 0.92% LiH, 0.28% benzamide were used in polymerizing caprolactam at 230° C. and 255° C., respectively.

Rapid polymerization catalysts other than lithium hydride which may be used in practicing the invention are sodium metal, sodium hydroxide, sodium carbonate, calcium metal, lithium metal, and others.

Polymers prepared in accordance with the teachings of the invention may be readily formed into fibers capable of being cold drawn. These polymers may also be used in the manufacture of films, plastic articles and other shaped products.

The invention is applicable to the continuous polymerization of cyclic amides containing at least six annular carbon atoms, that is, lactams of amino-carboxylic acids having at least five aliphatic carbon atoms between the amine and the carboxyl groups. Lactams other than caprolactams which may be used as monomeric materials are cyclopentadecanone isoxine, methylcyclohexanone isoxine, etc.

The present invention makes possible the continuous polymerization of cyclic amides, that is to say, the monomer together with the catalyst and a chain stopper is continuously fed into the reaction equipment and the polymer is continuously withdrawn, this being made possible by the substantial elimination of the high initial viscosity peak. The temperature required for carrying out the polymerization may vary, depending on the monomer used. For epsilon-caprolactam a temperature of 215–260° C. at around one atmosphere is recommended.

It is intended that the scope of the invention will only be limited by the following claims.

What is claimed is:

1. A process for making a polymer from a cyclic amide containing more than six annular atoms comprising the steps of continuously supplying to a reaction vessel a water free cyclic amide monomer containing more than six annular carbon atoms, a rapid-polymerization alkaline catalyst selected from the group consisting of lithium hydride, sodium hydroxide, sodium carbonate, lithium and calcium, and an effective amount of a chain stopper selected from the group consisting of carbonamides in which the amide group is not an integral part of a ring structure, said carbonamides being selected from the group consisting of formamides, benzamides, diacetyl tetramethylene diamine, adipamide and terephthalamide, subjecting the mixture to polymerization conditions, said conditions comprising a temperature within the range of 215 to 260° C. and the substantial absence of air, and continuously withdrawing a polyamide from said reaction vessel, said chain stopper substantially eliminates initial conditions of extremely high viscosity which impedes the flow of the polymerization mass through the process vessel.

2. A process for polymerizing epsilon-caprolactam comprising the steps of continuously supplying a substantially water-free epsilon-caprolactam, a rapid-polymerization alkaline catalyst selected from the group consisting of lithium hydride, sodium hydroxide, sodium carbonate, lithium, sodium and calcium and an effective amount of a chain stopper selected from the group consisting of carbonamides in which the amide group is not an integral part of a ring structure, to a reaction vessel, said carbonamides being selected from the group consisting of formamides, benzamides, diacetyl tetramethylene diamine, adipamide and terephthalamide, subjecting the mixture to polymerizing conditions, said conditions comprising a temperature of about 230° C. and the substantial absence of air, and continuously withdrawing polyamide from said reaction vessel, said chain stopper substantially eliminates initial conditions of extremely high viscosity which impedes the flow of the polymerization mass through the process vessel.

3. The process of claim 2 wherein the chain stopper is benzamide.

4. The process of claim 2 wherein the chain stopper is acetanilide.

5. The process of claim 3 wherein the catalyst is lithium hydride.

6. The process of claim 4 wherein the catalyst is lithium hydride.

7. A process of polymerizing epsilon-caprolactam comprising the steps of continuously supplying a substantially water-free caprolactam, a rapid-polymerization alkaline catalyst selected from the group consisting of lithium hydride, sodium hydroxide, sodium carbonate, lithium, sodium and calcium, and a small amount of a carbonamide chain stopper to a reaction vessel, said carbonamide being selected from the group consisting of formamides, benzamides, diacetyl tetramethylene diamine, adipamide and terephthalamide, heating the mixture in the substantial absence of air to a temperature of at least 200° C. until substantial polymerization occurs, and continuously withdrawing polyamide from the reaction vessel, said chain stopper substantially eliminates initial conditions of extremely high viscosity which impedes the flow of the polymerization mass through the process vessel.

8. The process of claim 7 wherein the amide chain stopper is selected from the group consisting of benzamide, acetanilide, and acetamide.

9. The process of claim 8 wherein the catalyst is lithium hydride.

10. A continuous process for the preparation of polyamides which comprises continuously supplying to a reaction vessel a water-free cyclic amide monomer containing more than six annular carbon atoms, at least one rapid polymerization catalyst selected from the group consisting of lithium hydride, sodium hydroxide, sodium carbonate, lithium, sodium and calcium and an effective amount of a carbonamide chain stopper in which the amide group is not an integral part of a ring structure, said carbonamide being selected from the group consisting of benzamide, acetanilide, acetamide, diacetyl hexamethylene diamine, dimethyl formamide, formamide, N-methyl benzamide, 4-methyl benzamide, 4-chloro benzamide, diacetyl tetramethylene diamine, adipamide and terephthalamide, heating the mixture in the substantial absence of air at a temperature of at least 200° C. until substantial polymerization occurs, and continuously withdrawing polyamide from the reaction vessel, said chain stopper substantially eliminating initial conditions of extremely high viscosity which impede the flow of the polymerization mass through the process vessel.

References Cited in the file of this patent

UNITED STATES PATENTS

| 2,174,527 | Peterson | Oct. 3, 1939 |
| 2,241,322 | Hauford | May 6, 1941 |
| 2,241,323 | Greenwalt | May 6, 1941 |
| 2,805,214 | Timmerman | Sept. 3, 1957 |

FOREIGN PATENTS

| 520,952 | Belgium | Dec. 28, 1953 |